L. S. TURNBO.
RAT TRAP.
APPLICATION FILED JAN. 4, 1909.
944,926.
Patented Dec. 28, 1909.
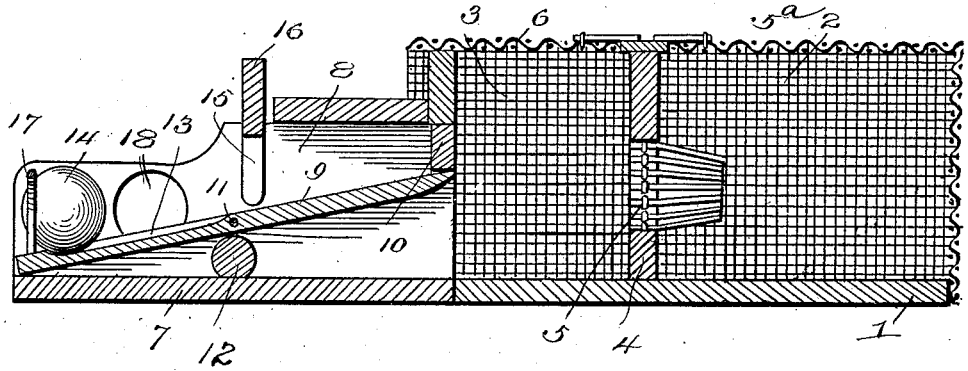
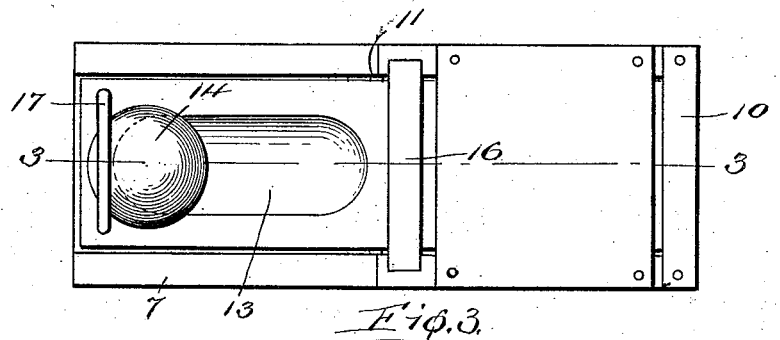
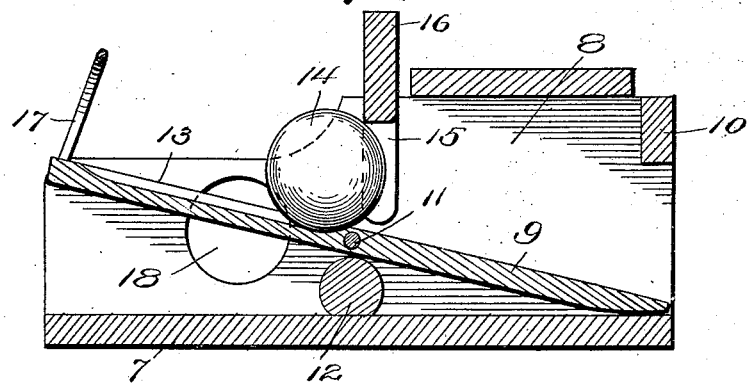
Witnesses
J. N. Fowler Jr.
A. S. Kitchin.
Inventor
Lycurgus S. Turnbo
By Mason Fenwick Lawrence
his Attorneys

UNITED STATES PATENT OFFICE.

LYCURGUS S. TURNBO, OF MAUD, TEXAS.

RAT-TRAP.

944,926.　　　　　Specification of Letters Patent.　　Patented Dec. 28, 1909.

Application filed January 4, 1909. Serial No. 470,739.

*To all whom it may concern:*

Be it known that I, LYCURGUS S. TURNBO, a citizen of the United States, residing at Maud, in the county of Bowie and State of Texas, have invented certain new and useful Improvements in Rat-Traps; and I do hereby declare the following to be a full, clear, and exact description of the invention, such as will enable others skilled in the art to which it appertains to make and use the same.

This invention relates to improvements in traps, and particularly to traps for catching rats, mice and the like, and has for an object the provision of means for causing the animal to enter the trap after having once started to do so.

A further object of the invention is the provision of a trap having a chamber for receiving and holding an animal, an intermediate chamber, and an entrance chamber, together with means for closing the entrance chamber after the animal has entered therein, and at the same time opening the intermediate chamber for permitting the animal to enter from the entrance to the intermediate chamber, and from thence to the chamber for receiving and holding the animal.

With these and other objects in view the invention comprises certain novel constructions, combinations and arrangement of parts as will be hereinafter more fully described and claimed.

In the accompanying drawings: Figure 1 is a longitudinal vertical section through a trap embodying the features of the invention. Fig. 2 is a top plan view of the entrance chamber and moving parts that close the entrance chamber. Fig. 3 is a section through the structure shown in Fig. 2 on line 3—3.

In constructing a trap according to the present invention a housing 1 is provided having chambers 2 and 3. A partition wall 4 constructed of wood or metal is provided in housing 1 for dividing the same into chambers 2 and 3, and secured to the partition wall 4 are a plurality of rods 5 that converge inwardly toward the center of chamber 2, and constitute a funnel-shaped passageway. By this construction when an animal enters into chamber 3 the same may pass on through into chamber 1 with little or no trouble, but if attempting to pass back into chamber 2 will engage the ends of rods 5 which are preferably sharpened. Also rods 5 if desired may be made flexible so that in entering the same may be forced slightly apart, but such action cannot take place if the animal attempts to return that way. A door or lid $5^a$ is provided for chamber 2 in order to present means by which the animal may be readily removed. A door 6 is also provided for chamber 3 for removal of the animal from that chamber if it is desired or should become necessary.

Connected with housing 1 is a housing 7 that is formed with a reception or entrance chamber 8. Mounted in housing 7 is a pivotally arranged tilting board 9 that at the inner end normally engages a cross board or top 10 and at the outer end rests against the floor of housing 7. Board 9 is pivotally mounted on rod 11 and has arranged below the rod 11 a filling block 12 in order to prevent any escape of the animal beneath board 9. Board 9 extends outward to near the end of housing 7, and is formed with a groove or runway 13 in which is mounted a ball 14 that is adapted to fill or close entrance 15 formed in partition 16. A stop 17, preferably of some stiff wire or rod is arranged near the outer end of board 9 for preventing ball 14 from moving off the board.

As will be clearly seen from Figs. 1 and 3 ball 14 remains on one side of pivot 11 so that board 9 is always over-balanced, except when an animal has passed through opening or entrance 15 into chamber 8. When an animal has passed into chamber 8 the board is tilted as seen in Fig. 3 and ball 14 moves down under gravity and closes opening 15. Ball 14 remains in this position until the animal has stepped out of the chamber entrance into the intermediate chamber 3. Immediately upon the removal of the weight of the animal from the inner end of board 9 ball 14 will over-balance the board and move under gravity to the position shown in Fig. 1. This will cause the inner end of the board to move up against stop 10 and effectually prevent the animal in the intermediate chamber 3 from returning through opening 15. Though the animal cannot enter chamber 8 it may pass through the rods 5 into chamber 2, and from thence may be removed out by lid $5^a$. If desired lids $5^a$ and 6 may be secured positively in a closed position by a hook or other means. If the animal does not pass through rods 5 but remains in chamber 3 it may be easily removed through door 6, though ordinarily the movement of the inner end of board 9 upward and the noise of the same striking against top 10 would sufficiently frighten the animal to cause it to endeavor to escape toward the front, and in this endeavor would pass into chamber 2 from which return is impossible.

Housings 1 and 7 are preferably made independently of each other, and as stated, housing 1 is preferably made from a wire mesh and housing 7 of wood, though other material may be used, as for instance the entire trap may be made from wire mesh or metal and a suitable ball of hollow metal or wood. In housing 7 is formed a plurality of openings 18 through which the animal may pass in order to take a position upon board 9, or if the animal prefers he may pass over the sides of housing 7 and then down upon board 9, and from thence into chamber 8. In entering chamber 8 after he has entered sufficiently far for his weight to over-balance ball 14, the ball will immediately roll downward and strike against him and frighten him. This fright will be increased by the return movement of the inner end of board 9 after he has entered chamber 3. This frightening of the animal will cause him to quickly pass through rods 5 into chamber 2 where he must remain until removed.

In setting the trap bait may be placed in any desired place, in chambers 2, 3 or 8 as may be desired, or in all of the same, though ordinarily a little bait on the inner end of board 9 will be sufficient.

What I claim is:

In a trap, an entrance chamber, a retention chamber, an intermediate chamber, a partition separating the intermediate and retention chambers, a funnel-shaped resilient passageway carried by the partition and opening into the retention chamber, a pivoted platform, a stop arranged in front of the intermediate chamber and with which one end of the platform contacts, a ball for retaining the platform normally in engagement with the stop, and a partition arranged slightly in advance of the pivotal point of the platform, and provided with an entrance arranged to be closed by the ball when the platform is tilted by an animal entering the trap.

In testimony whereof I affix my signature in presence of two witnesses.

LYCURGUS S. TURNBO.

Witnesses:
J. L. McCloskey,
W. D. Nelson.